(12) United States Patent
Ostermiller et al.

(10) Patent No.: US 6,282,177 B1
(45) Date of Patent: Aug. 28, 2001

(54) METHOD AND APPARATUS FOR DYNAMICALLY CONTROLLING THE BIAS CURRENT IN A RECEIVER IN RESPONSE TO THE TRANSMITTER POWER

(75) Inventors: Dirk Ostermiller, Salt Lake City; Sy Prestwich, West Jordan, both of UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/034,653

(22) Filed: Mar. 4, 1998

(51) Int. Cl.[7] .................................................. H04B 5/005
(52) U.S. Cl. .......................................... 370/278; 370/311
(58) Field of Search ..................................... 370/278, 277, 370/311; 375/345; 455/67.1, 70, 68, 116, 117; 330/129

(56) References Cited

U.S. PATENT DOCUMENTS

| 5,129,098 | 7/1992 | McGirr et al. ........................ 455/69 |
| 5,179,724 | 1/1993 | Lindoff .................................. 455/76 |
| 5,218,641 | 6/1993 | Abe et al. ............................. 381/79 |
| 5,311,143 | 5/1994 | Soliday ................................ 330/127 |
| 5,475,870 | * 12/1995 | Weaver, Jr. et al. ................ 455/67.1 |
| 5,513,386 | 4/1996 | Ogino et al. ....................... 455/234.1 |
| 5,564,080 | 10/1996 | Eul et al. .............................. 455/69 |
| 5,627,857 | * 5/1997 | Wilson ................................ 375/345 |
| 5,722,053 | * 2/1998 | Kornfield et al. .................... 455/70 |
| 5,892,396 | * 4/1999 | Anderson et al. ................... 330/129 |
| 5,940,749 | * 8/1999 | Cho et al. ........................... 375/345 |
| 6,011,323 | * 1/2000 | Camp ................................. 455/117 |
| 6,041,081 | * 3/2000 | O et al. .............................. 455/116 |

\* cited by examiner

Primary Examiner—Salvatore Cangialosi
(74) Attorney, Agent, or Firm—Workman, Nydegger & Seeley

(57) ABSTRACT

A method and apparatus for minimizing the power consumed by a low-noise amplifier in a receiver portion of a full duplex transceiver when the transmit signal power of the transceiver as presented to the low-noise amplifier exceeds the receive signal power and would further cause the low-noise amplifier to enter into a compression state thereby introducing distortion onto the receive signal. A transmit power control indicator designates a modified transmit power level for use by the transceiver. The transmit portion of the transceiver alters the transmit power level accordingly while the receiver portion of the transceiver monitors the change in the transmit portion and generates a bias control signal altering the bias level of the low noise amplifier to a level compatible with the modified transmit power level. Such a tracking of the bias current of the low noise amplifier both facilitates the use of lower-isolation duplexers and also reduces power consumption for portable transceivers.

20 Claims, 4 Drawing Sheets

METHOD AND APPARATUS FOR DYNAMICALLY CONTROLLING THE BIAS CURRENT IN A RECEIVER IN RESPONSE TO THE TRANSMITTER POWER

BACKGROUND OF THE INVENTION

1. The Field of the Invention

This invention relates generally to radio transceivers operating in full duplex mode. More particularly, the invention relates to dynamically controlling the bias level in a receiver portion of a transceiver to prevent compression by the transmitter power.

2. Present State of the Art

Modern communication devices in order to facilitate the user's communication behavior, accommodate the simultaneous transmission of both spoken or data information and the reception of similar information. Such a simultaneous exchange in a user transceiver is known as full duplex communication. Users of communicating devices have become accustomed to such simultaneous transmit and receive capabilities in wired communicating devices such as standard telephones. To prevent the transmitting signal from contaminating a received signal, traditional telephone systems have employed isolated wires or differentiating propagation modes to facilitate the dedicated exchange of information. Likewise, in wireless or radio communication devices employing full duplex transceivers, the transmitter and receiver of the full duplex transceiver device employ separate communication frequencies to minimize interference between the simultaneous transmitting and receiving signals. Such a frequency isolation provides the necessary separation for the information once it is broadcast into the propagation medium such as the ether about the full duplex transceiver. However, full duplex transceivers utilize a single internal conduit through which both transmit and receive signals are routed to the full duplex transceiver's antenna.

Those skilled in the art of electromagnetic propagation appreciate that the signal levels of the transmit signal are many orders of magnitude larger within the transceiver than are the received signals as presented to the transceiver. For example, transmission signals prior to exiting the full duplex transceiver may exhibit signal levels on the order of 8 dBm to 28 dBm while the received signals at the transceiver are on the order of −113 dBm. It should be appreciated that such a discrepancy in power signal magnitudes may result in the received signal being wholly overwhelmed by the signal levels of the transmit signal. To prevent such a condition from occurring, full duplex transceivers have employed a duplexer which provides a barrier or isolation between the transmitter portion of the transceiver and the receiver portion of the transceiver. Such a duplexer largely filters the transmitter signal from overwhelming the received signal. While duplexers do not entirely remove the transmitter signal as seen at the receiver portion of the transceiver, at a minimum, the duplexer reduces the transmit signal level, as perceived at the receiver, to a signal level more similar to those of the received signal.

In a traditional receiver, the reduced transmit signal level and the received signal are thereafter processed through a low-noise amplifier to boost both signals to a usable level such that additional circuitry may extract the received signal from the contaminating affects of the transmit signal. To provide the aforementioned isolation between the transmit and receive signals, duplexers have taken on rather large form-factors in transceivers. Radio transceivers have likewise taken on various form factors such as vehicle-mounted transceivers commonly used by dispatch services, and modernly even more portable versions include handheld cellular telephones. As mentioned previously, because of the isolation requirements of a duplexer in minimizing the transmitter's transmit signal level as perceived by the receiver, duplexers are required to assume a substantial dimension. While such a substantial dimension may be tolerated by even handheld transceiver devices such as portable cellular telephones, when a transceiver device is reduced in size much beyond a handheld form factor, the duplexer dimension becomes a driving and dominant restriction upon the overall transceiver device form factor.

In order to accommodate smaller form-factor transceivers, the isolation capability of the duplexer must be compromised. However, by compromising the duplexer isolation capability, the large signal levels of the transmit signal contaminate the receive signal by overwhelming the dynamic range of the receiver amplifiers. That is to say, receiver amplifiers in order to accurately replicate the signal as received, must amplify such a signal to a larger and more usable signal level for further processing. Those skilled in the art, recognize that amplifiers are not wholly linear devices. That is to say, amplifiers have a linear region in which operation is more favorable and also have a non-linear region in which distortion may be injected into the received signal. When transmit signals are of a sufficient magnitude when presented to an amplifier such as a low-noise amplifier (LNA), the higher signal levels associated with the contaminating transmit signal drive the LNA into a non-linear region thereby distorting the received signal. Also, when driven into compression by the transmitter signal, the effective gain for the received signal is reduced and the received signal may not be amplified enough for proper receiver operation. To prevent the larger transmit signals from driving the LNA into such a compressive or distortive non-linear state, the bias level of the LNA must be increased in order to raise the linear and non-distortive region of operation of the LNA. Such an increase in the bias level taxes the overall power of the transceiver device. While transceiver devices having unlimited available power may tolerate the additional syphoning of system power to accommodate higher bias levels for the higher transmit signal levels, portable devices operating on resources such as battery power, cannot tolerate such an impact to the overall system performance.

Another functional detail of some modern full duplex applications is that full duplex transceivers operating in certain environments such as cellular environments interact with base stations at various locations. In such systems, in order to minimize interference with adjacent base stations, a base station may notify a transceiver of the signal quality as received at the base station of the signal as transmitted by the transceiver. When the base station determines the signal amplitude, and hence the transmit power level, to be in excess of that required for tolerable communication, the base station notifies the transceiver of a lower power level setting adequate for interaction. While a lower transmit power level may allow the bias level of the LNA to be reduced, the LNA must be able to accommodate the highest power level of the transmitter in order to prevent the LNA from going into a compression state.

Thus, what is needed is a method and system for tolerating the higher transmit power levels presented at the receiver front-end in a full duplex transceiver due to reduced isolation therebetween, without causing the receiver front-end to enter a distortion-creating non-linear region. What is yet further needed is a method and system for minimizing the bias level power consumption of a receiver front-end when the transmit power of the transceiver varies.

SUMMARY AND OBJECTS OF THE INVENTION

It is an object of the present invention to provide a method and apparatus for minimizing the power consumed by a low-noise amplifier in a receiver portion of a full duplex transceiver when the transmit signal power of the transceiver presented to the low-noise amplifier exceeds the allowed receive signal power at the low-noise amplifier and would thereby cause the low-noise amplifier to enter a compression state.

Another object of the present invention is to provide a method and apparatus for allowing a full duplex transceiver to employ an undersized duplexer without causing a low-noise amplifier in a receiver portion of the full duplex transceiver to enter into a compression state when subjected to the high signal levels associated with the transmit power output.

Yet another object of the present invention is to provide a bias circuit for a low-noise amplifier in a receiver portion of a full duplex transceiver wherein the transmit signal power of the transceiver as presented to the low-noise amplifier exceeds the allowed receive signal power presented to the low-noise amplifier and would thereby cause the low-noise amplifier to enter into a compressive state.

A still further object of the present invention is to provide a full duplex transceiver capable of minimizing the power required for biasing a low-noise amplifier in a receiver portion of the full duplex transceiver when the transmit power level varies as directed by a transmit power indicator.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. To achieve the objects, and in accordance with the invention as embodied and broadly described herein, a method and system for minimizing the power consumed by a low-noise amplifier in a receiver portion of a full duplex transceiver when the transmit signal power would otherwise cause the low-noise amplifier to enter into a compressive state is provided.

The present invention is implemented through a dynamic bias circuit for a low-noise amplifier which is capable of tracking a transmit signal power level for determining a minimum amount of bias current necessary to prevent the low-noise amplifier in the receiver portion of the full duplex transceiver from entering into a compression state when the duplexer associated with the full duplex transceiver is undersized and therefore incapable of providing sufficient isolation of the transmit signal power to the low-noise amplifier or when very high transmit power levels are used.

In the present invention, a full duplex transceiver, when roaming a greater distance from a base station, would be instructed by the base station through an issuance of a transmit power level indicator to enhance the transmit power level when transmitting to the base station. While the base station dictates to the transceiver to alter its transmit power level for compatible interaction with a base station, a dynamic or varying transmit level within the transceiver presents a varying transmit power level presented to a receiver portion of the full duplex transceiver that must be dealt with therein by the receiver portion of the transceiver to prevent distortion due to the compression state entered into by the low noise amplifier if the transmit signal level is not adequately attenuated.

In a full duplex transceiver, the transmit power level is received and routed through a shared path or channel to the transceiver which receives the requested transmit power level information into the receiver portion of the transceiver for demodulation and evaluation. The received signal contains receive information and a desired transmit power level indicator for down conversion and demodulation and may be subsequently digitized by a CODEC for evaluation and interpretation by a processor.

Following the receipt and processing of the transmit power control indicator, a transmit power control module generates a transmit power control signal regulating the transmit power of the transmitter power amplifier. The transmit power signal level exhibited by the transmit power amplifier provides an adequate or sufficient transmit signal power level for compatible propagation to the base station via a duplexer and an antenna within the transceiver. A portion of the transmit power destined for propagation to a remote base station couples through the duplexer to combine with the received signal arriving at the shared antenna to form a combined transmit/receive signal with the transmit signal power being substantially larger than the propagation-weakened receive signal power as exhibited in the combined transmit/receive signal.

Those of skill in the art appreciate that amplifiers, such as a low noise amplifier in the receiver, exhibit a linear region wherein the gain remains constant and the output of the amplifier presents a reasonably accurate magnification or amplification of the input signal. Furthermore, amplifiers also have a saturation region wherein the amplification does not assume a linear gain profile and introduces distortion into the received signal. To maintain the linearity of the receiver's low noise amplifier, the present invention further includes a low-noise amplifier bias control module operably coupled to the transmit power control module or may operate independently for receiving a low-noise amplifier bias control signal. The low-noise amplifier bias control module issues a bias signal to the low-noise amplifier to adjust the bias level to accommodate the dynamic range of the transmit power signal or to conserve power in the receiver. That is to say, when the received transmit power level indicator dictates to the transmit power amplifier to operate at a reduced power level, the transmit signal power as received at the combined transmit/receive signal is presented at a lower power level wherein the bias control signal to the low-noise amplifier may also be reduced thereby conserving power resources utilized by low-noise amplifier.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention embodies within its scope both method and apparatus for dynamically controlling the bias power consumed by a low-noise amplifier in a receiver portion of a full duplex transceiver when the transmit signal power of the transceiver varies according to received direction from a remote base station and when such transmit signal power exceeds the receive signal power presented to the low-noise amplifier and would otherwise cause the low-noise amplifier to enter into a compression state or otherwise consume a maximum amount of power unless dynamically biased in accordance with the present invention. The purpose of the invention is to provide a means and method for undersizing a duplexer in a full duplex transceiver without causing the low-noise amplifier in a receiver portion of the full duplex transceiver to enter into a compression state.

The present invention further provides a dynamic bias circuit for a low-noise amplifier which is capable of tracking a transmit signal power level for determining a minimum amount of bias current necessary to prevent a low-noise amplifier in the receiver portion of the full duplex transceiver from entering into a compression state when the duplexer associated with the full duplex transceiver is undersized and therefore incapable of providing sufficient isolation of the transmit signal power to the low-noise amplifier. As used within this application, the term "transceiver" refers to any radio device capable of simultaneous transmission and reception (full duplex) of signal information. Furthermore, the term "host system" implies within its scope both personal and other forms of computers including portable and mobile implementations as well as embedded controller implementations.

Figure 1:
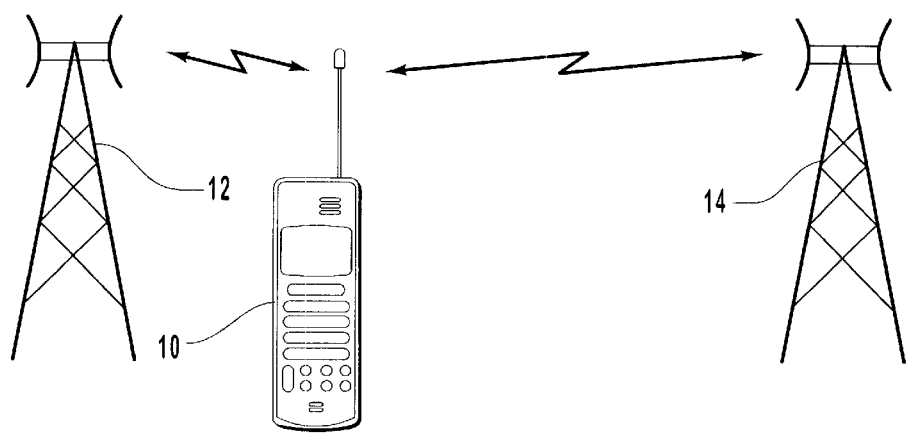
FIG. 1 is a simplified diagram of a full duplex transceiver interacting with various base stations requiring a differential amount of transmit power from the transceiver, in accordance with the preferred embodiment of the present invention.

FIG. 1 depicts an environment wherein a wireless transceiver may compatibly interact with fixed site or wired base stations, in accordance with the embodiment of the present invention. A wireless transceiver, as the name implies, facilitates communication through the transmission and reception of electromagnetic signals propagating through an air medium. Those skilled in the art of electromagnetic propagation appreciate that power levels of electromagnetic signals decay as a function of distance from the source. For example, in FIG. 1, a full duplex transceiver 10 may transmit and receive electromagnetic signals with a base station possessing a variable orientation and distance from full duplex transceiver 10. As illustrated in FIG. 1, full duplex transceiver 10 may interact with base station 12 by transmitting and receiving electromagnetic signals therebetween. Likewise, full duplex transceiver 10 may also interact with a base station 14 by also exchanging electromagnetic signals therebetween. It should be appreciated that given substantially equivalent propagation characteristics, the transmit power levels associated with a communication session between full duplex transceiver and base station 12 are significantly less due to the reduced propagation distance therebetween. Furthermore, the transmit power levels associated with a communication session between full duplex transceiver 10 and base station 14 are significantly larger due to the enhanced distance therebetween.

In a wireless communication system such as one employing reusable frequencies, generically known as cellular communication systems, a full duplex transceiver communicates with a single base station until another base station presents more favorable propagation characteristics. In the present example, full duplex transceiver 10 generally interacts with base station 12 for exchanging information therebetween. Furthermore, in traditional cellular applications, in order to mitigate interference with adjacent base stations and other base stations reusing frequency channels, a base station such as base station 12 would interact and communicate to full duplex transceiver 10 a transmit level indicator instructing full duplex transceiver 10 to set transmit power to a level sufficient for compatible interaction therebetween thereby minimizing interference to adjacent base stations. In the present example of FIG. 1, full duplex transceiver 10 when roaming a greater distance from base station 12 would be instructed by base station 12 through another issuance of a transmit power level indicator to enhance the transmit power level when transmitting to base station 12. Since the base station dictates to the transceiver commands to alter its transmit power level for compatible interaction with a base station, such a dynamic or varying transmit level within the transceiver presents a varying transmit power level as presented to a receiver portion of the full duplex transceiver that must be dealt with therein by the receiver portion of the transceiver. As discussed above, prior art implementations have fixed the receiver portion at a higher current consuming level capable of handling the maximum transmit power levels. In the present invention, the receiver portion utilizes the transmit power level indicator information as dictated to the transmitter power for making power conserving adjustments to the bias level of the receiver portion of the transceiver as further detailed in FIG. 4.

Figure 2:
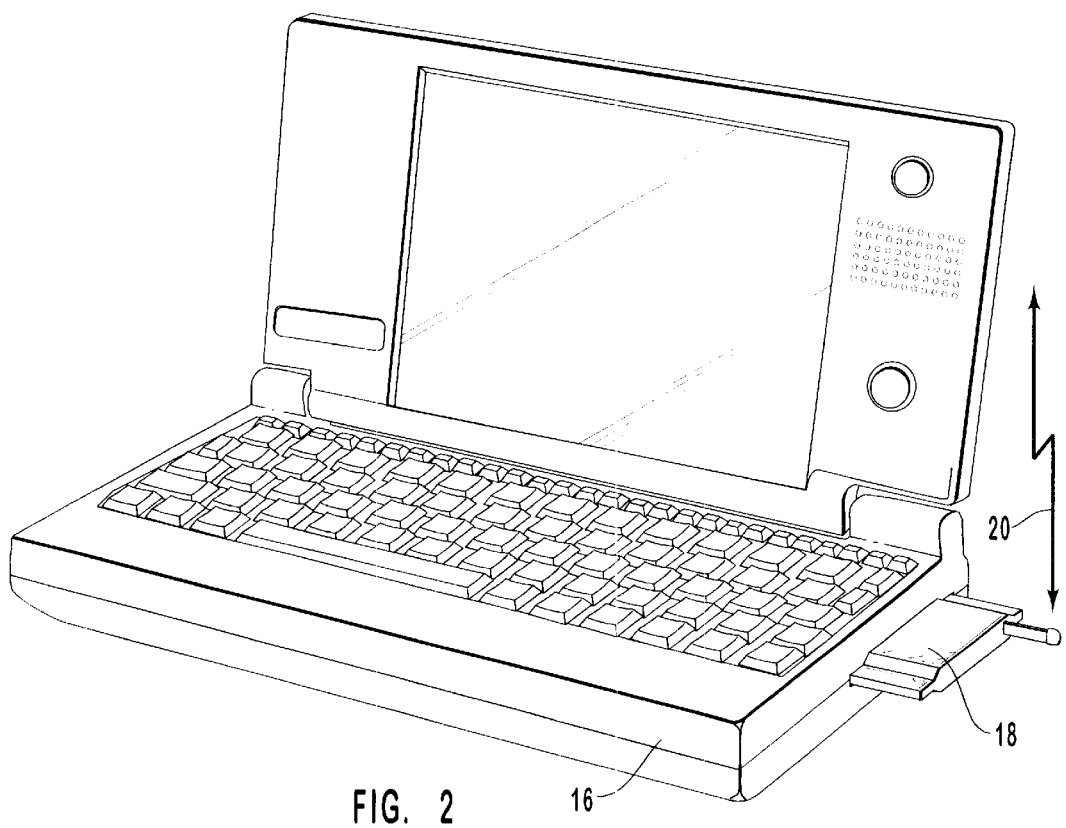
FIG. 2 depicts an application utilizing a small form-factor transceiver, in accordance with the preferred embodiment of the present invention.

FIG. 2 depicts an environment wherein an integrated full duplex transceiver having dimensional constraints may employ the techniques of the present invention. A host system 16 provides a user interface wherein information may be presented by a user for transmission or displayed to a user following reception. Such information may take the form of digital data or may additionally include analog data such as voice information. As host system 16 takes the form of a processing host, a transceiving module such as full duplex transceiver 18 interfaces therewith. Full duplex transceiver 18 provides both a transmitter and a receiver for facilitating a communication channel 20 with a remote site such as a base station. While full duplex transceiver 18 is depicted as a PC-Card having a PCMCIA form-factor, other implementations are also contemplated within the scope of the invention such as an external module or a module incorporating host or interface functionality therein. Furthermore, while FIG. 2 depicts full duplex transceiver 18 as interfacing with host system 16, other embodiments such as integrated or independent full duplex transceivers incorporating minimal additional interface functionality such as a microphone and speaker combination or other data interfaces are also included within the scope of the present invention and may employ the methods for power reduction and receiver amplifier compression techniques as described herein.

Figure 3:
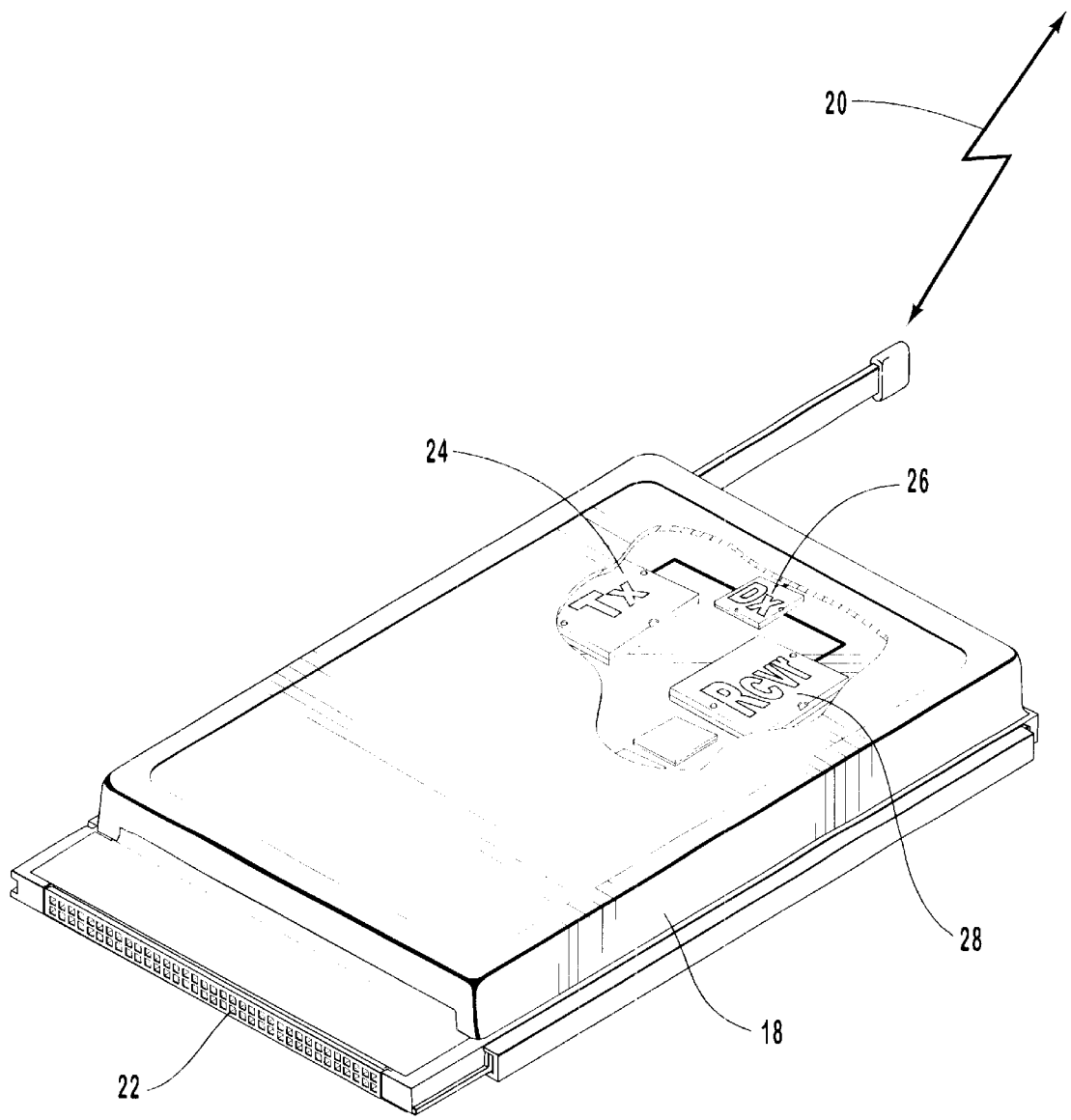
FIG. 3 depicts a wireless transceiver having a small form-factor wherein the dynamic biasing of a low-noise amplifier in the receiver portion may both reduce the power consumption and prevent the low-noise amplifier from entering into a compression state, in accordance with a preferred embodiment of the present invention.

FIG. 3 depicts a full duplex transceiver assuming an integrated module form-factor, in accordance with an embodiment of the present invention. Full duplex transceiver 18 exemplary assumes a form-factor consistent with a PCMCIA module having an interface capable of interacting with a host system. By way of example, and not limitation, the full duplex transceiver incorporates a PCMCIA host interface 22 for interaction with a host system such as depicted in FIG. 2.

In the present depiction, full duplex transceiver 18 assumes a form-factor incompatible with a duplexer capable of providing sufficient isolation between a transmit portion and a receive portion. In FIG. 3, a duplexer 26 must fit within the confines of the dimensions specified by the module or form-factor incorporating the is full duplex transceiver. Those skilled in the art of full duplex transceivers appreciate that duplexer devices that provide acceptable levels of isolation between a transmit portion and a receive portion of a full duplex transceiver assume a substantial dimension heretofore incompatible with integrated transceivers such as those assuming an integrated form-factor like a PCMCIA module. That is to say, a duplexer 26 capable of integration within a PCMCIA module or other integrated footprints, provides insufficient isolation, in a wireless communication environment such as a cellular application, between a transmit portion 24 and a receive portion 28 of full duplex transceiver 18. That is further to say, that transmitter portion 24 when transmitting information over a communication channel 20 also introduces a substantial transmit signal having a power level substantially higher than the receive signal to receiver portion 28. Those skilled in the art of full duplex transceiver design further appreciate that such high transmit signal levels presented to the front-end of a receiver portion may cause the receiver amplifier, such as a low-noise amplifier (LNA), to enter into a non-linear state also known as a compression state thereby introducing unwanted distortion into the received signal.

The present invention further contemplates a wireless communication system wherein the transmit power level adjusts as directed by a base station to mitigate interfering transmissions at power levels beyond those adequate for the propagation environment. As the receiver portion of a full duplex transceiver remains activated either continuously or for a large transmit/receive duty cycle, maintaining a maximum bias current to prevent the LNA of the receiver portion of the full duplex transceiver from entering into a compressive state becomes imprudent particularly for applications having limited power resources.

Figure 4:
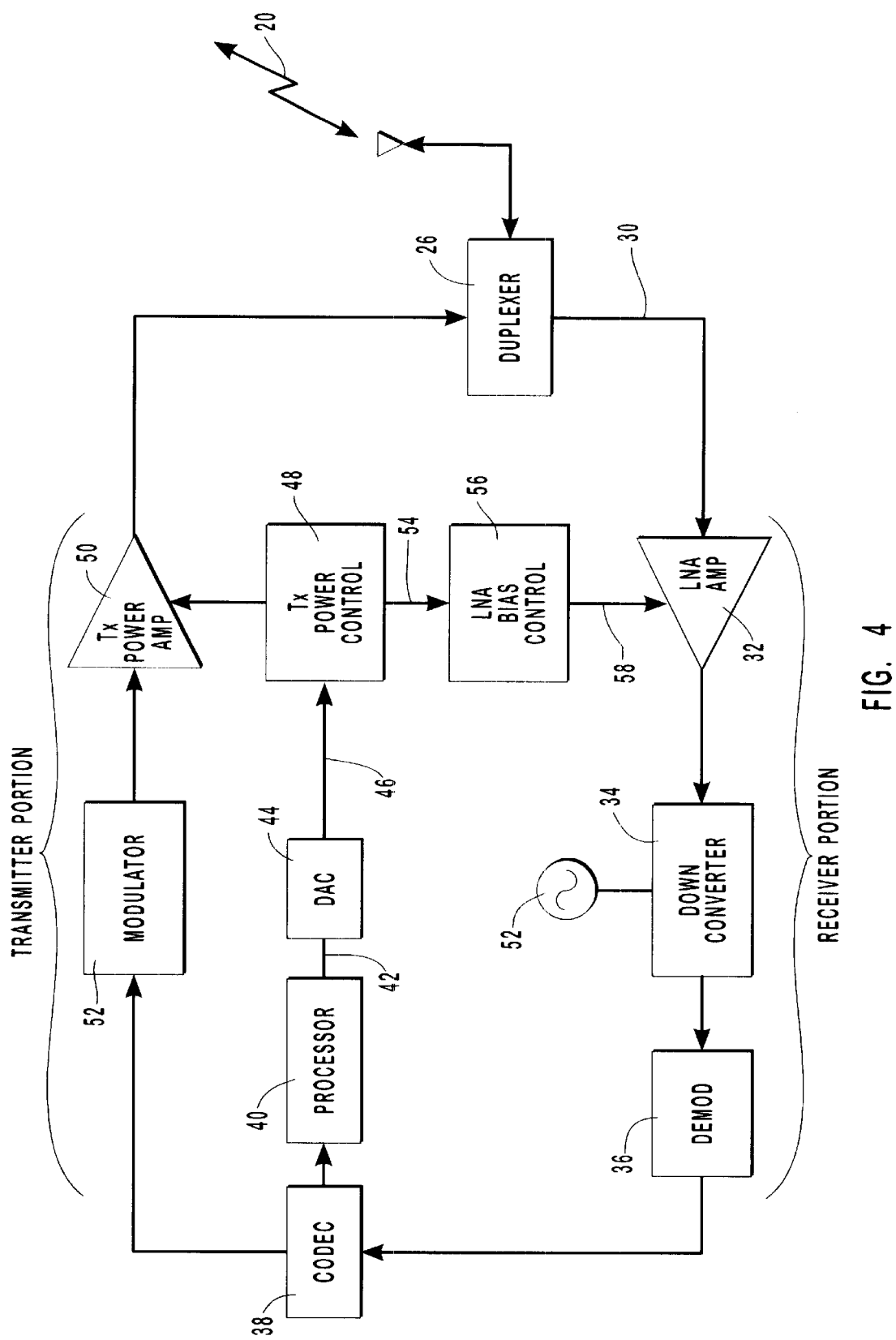
FIG. 4 is a block diagram of a full duplex transceiver employing dynamic bias control of the low-noise amplifier in the receive portion of the transceiver, in accordance with the preferred embodiment of the present invention.

FIG. 4 depicts a simplified block diagram of a dynamic bias circuit for a low noise amplifier in a receiver portion of a full duplex transceiver capable of tracking the transmit power level to minimize the bias power required by a low-noise amplifier to prevent such an amplifier from entering into a compressive state, in accordance with the preferred embodiment of the present invention. A full duplex transceiver 18 cooperatively interacts with a base station through a communication channel 20 to both simultaneously transmit and receive information therebetween. In the present invention, a base station or remote transceiver monitors the transmit power level of transceiver 18 to determine an adequate or sufficient level at which the transmitter of transceiver 18 should operate. Such a preferred transmit power level is dispatched through communication channel 20 to transceiver 18 which receives the requested transmit power level information into the receiver portion of the transceiver for demodulation and evaluation. The received signal containing receive information and a desired transmit power level indicator are passed to the receive portion and down converted by a down converter 34 and further demodulated by demodulator 36 and yet further digitized by a CODEC 38 for evaluation and interpretation by a processor 40. While FIG. 4 depicts both demodulation and the processing function of processor 40 as being located in discrete components, it is contemplated within the scope of the present invention to incorporate both devices into a single processing element such as a digital signal processor. Those skilled in the art of modulation theory will appreciate that such modulation may be digitally performed prior to conversion to an analog format.

Processor 40 upon extraction of the base station requested transmit power information determines a transmit power level indicator 42, and in the preferred embodiment, routes the digitized transmit power level indicator 42 to a digital-to-analog convertor 44 for the generation of a transmit power control signal 46. A transmit power control module 48 receives transmit power control signal 46 and thereupon generates a transmit power control signal regulating the transmit power of a transmitter power amplifier 50. The transmit power signal level exhibited by transmit power amplifier 50 provides an adequate or sufficient transmit signal power level for compatible propagation to the transmit power level indicator generating base station. Transmit power amplifier 50 thereafter receives a modulated transmit signal from a modulator 52 containing desired modulated transmit information for transmission to the base station (FIG. 1). Transmit power amplifier 50 thereafter transfers the amplified modulated transmit signal to a duplexer 26 for dispatch via an antennae over communication channel 20 to the base station.

Those skilled in the art of full duplex transceivers appreciate that a portion of the transmit power destined for propagation to a remote base station couples through the duplexer to combine with the received signal arriving at the shared antenna to form a combined transmit/receive signal 30. As briefly explained above, the transmit signal power as exhibited at combined transmit/receive signal 30 is substantially larger than the propagation-weakened receive signal power as exhibited at combined transmit/receive signal 30 while the differential in magnitude between the transmit and receive signals are substantial, prior implementations utilizing duplexers of substantial dimensions have provided sufficient isolation to reduce the transmit signal power levels to a tolerable degree such that the receiver portion of the transceiver does not enter into a compression state whereby distortion is introduced into the receive signal. However, for more highly integrated full duplex transceivers, the duplexer must be reduced in size in order to comply with a form-factor requirement of the overall transceiver module. Likewise, other implementations of a full duplex transceiver may choose to employ a duplexer presenting a reduced isolation level for other design reasons.

In the present invention, a duplexer 26 provides isolation between the transmit signal and receive signal as combined to form combined transmit/receive signal 30 presented to a low-noise amplifier 32. Those skilled in the art of receiver design appreciate that amplifiers must be biased to operate in particular regions characteristic of amplifiers. For example, amplifiers exhibit a linear region wherein the gain remains constant and the output of the amplifier presents a reasonably accurate magnification or amplification of the input signal. Furthermore, amplifiers also have a saturation region wherein the amplification does not assume a linear gain profile. Operation of amplifiers in the saturation region also known as the compression state introduce unwanted distortion into to output signal which is not present on the input signal. Such a distortion impacts both the high magnitude signals associated with the unwanted transmit signal in addition to the low magnitude receive signals which are in need of amplification prior to additional processing. To facilitate the operation of an amplifier such as a low-noise amplifier in the desired linear region, a measured bias signal such as a voltage or current, is applied to the amplifier to accommodate the input signal levels of the amplifier to facilitate operation in the desired linear region.

In the present invention, when duplexer 26 provides less than desirable isolation of the transmit signal, the low noise amplifier may enter into the compression state without altering the bias current accordingly. It should be pointed out that the bias current could be statically set at a maximum value thereby accommodating the full range of transmit input signals, however, such an implementation needlessly wastes power resources available for the operation of the full duplex transceiver. Therefore, the present invention further includes a low-noise amplifier bias control module 56 operably coupled to transmit power control module 48 for receiving a low-noise amplifier bias control signal 54. Low-noise amplifier bias control module 56 issues a bias signal to low-noise amplifier 32 to adjust the bias level to accommodate the dynamic range of the transmit power signal. That is to say, when the received transmit power level indicator 42 dictates to transmit power amplifier 50 to operate at a reduced power level, the transmit signal power as received at combined transmit/receive signal 30 is presented at a lower power level wherein the bias control signal to the low-noise amplifier may also be reduced thereby conserving power resources utilized by low-noise amplifier 32.

Additionally, for applications employing an undersized duplexer 26 providing a lowered isolation between the transmit power signal as presented at combined transmit/receive signal 30, the bias control signal may be adjusted accordingly to accommodate the dynamic range of the transmit power signal as perceived at the low-noise amplifier without causing the low-noise amplifier to enter a compression state thereby injecting distortion onto the received signal.

It should be appreciated that prior implementations have utilized a transmit power level indicator for altering the transmit power amplifier 50, however, no such embodiments have utilized the available information of a transmit power level indicator 42 for regulating the bias control associated with the low-noise amplifier of a receiver portion of a full duplex transceiver. Such a regulation of the bias of a low-noise amplifier provides the benefits of enabling a transceiver to integrate smaller isolation-factor duplexers into designs including integrated modular designs and also integrating the present bias control technique into receivers for minimizing the power consumption associated with biasing amplifiers such as low-noise amplifiers in a full duplex transceiver.

Figure 5:
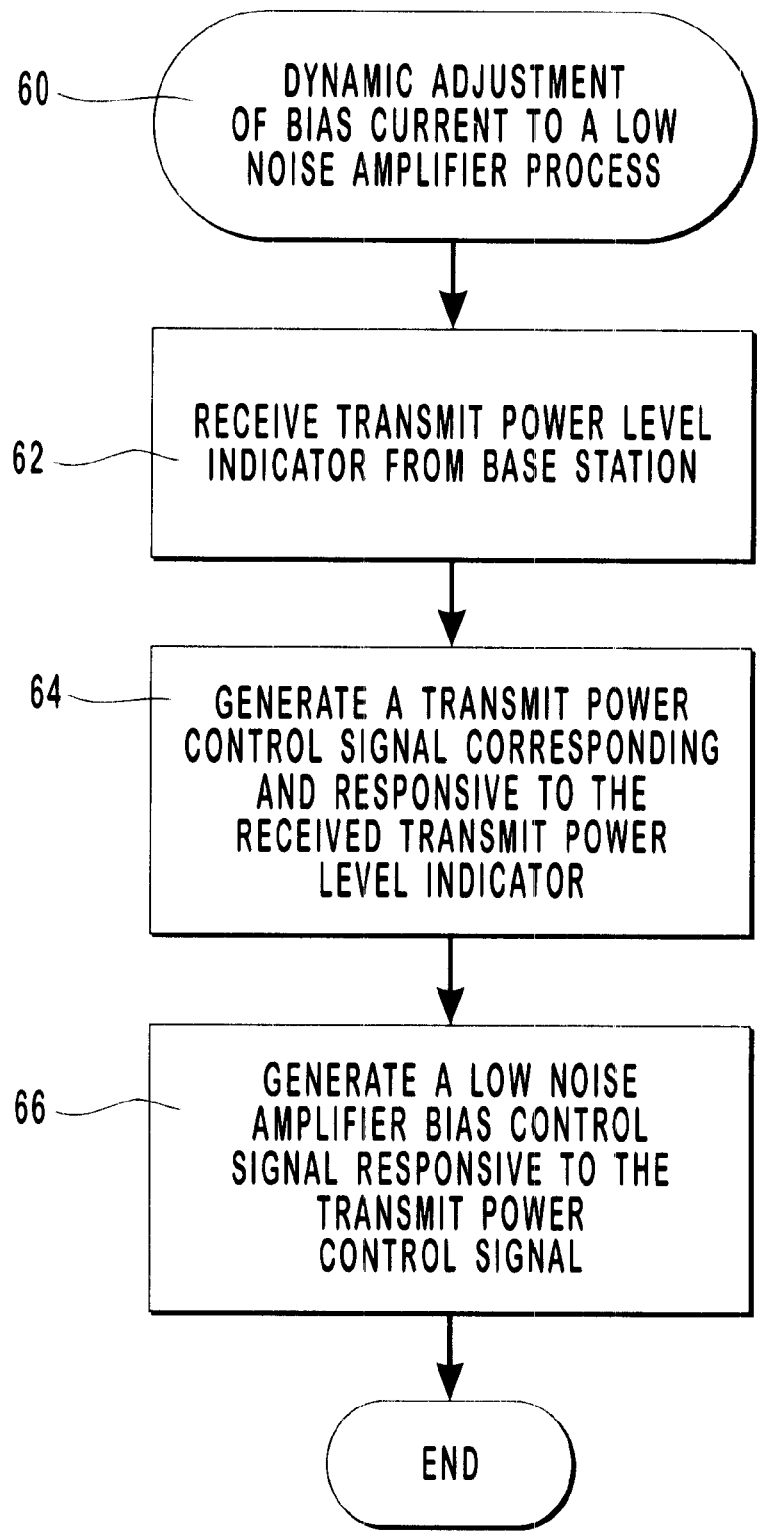
FIG. 5 is a flowchart for providing a dynamic adjustment of the bias current in the low-noise amplifier within a receive portion of a full duplex transceiver, in accordance with a preferred embodiment of the present invention.

FIG. 5 depicts a flowchart of a dynamic adjustment of bias current in a low-noise amplifier, in accordance with the preferred embodiment of the present invention. Dynamic adjustment of bias current process 60 involves a step 62 wherein a transmit power level indicator is received from a base station which has determined a transmit power level adequate for compatible interaction with the base station. Such an adequate power level may also be generated from considerations in systems, such as cellular systems, wherein frequencies are reused by distant cellular base stations. Such a minimization of the transmit power level reduces both the power consumed in the generation of the transmit signal at a full duplex transceiver as well as mitigating interference possibilities.

A step 64 generates a transmit power control signal corresponding to the transmit power level indicator as received from the base station. Generation of transmit power control signal directs a transmitter power amplifier to output transmit signals at a level responsive to and corresponding with the transmit power level indicator as received from the base station. By altering the transmit power level of the transmit power amplifier, the transmit signal level as present on combined transmit/receive signal 30 (FIG. 4) to the low-noise amplifier is dynamically altered proportional to the transmit power level indicator received from the base station.

In a step 66, a low noise amplifier control signal is generated which is responsive to the transmit power control signal generated for use by the transmit power amplifier in altering the transmit power level. The altered bias control signal is proportional and responsive to the transmit power signal thereby appropriately biasing the low-noise amplifier to a level capable of handling the transmit portion of the combined transmit/receive signal presented to the low noise amplifier without causing the low-noise amplifier to enter into a compression state thereby introducing unwanted distortion onto the receive signal.

The present invention may be embodied in other specific forms without departing from the spirit or essential characteristics. The described embodiments are to be considered in all respects as only illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a wireless communication system, a method for dynamically adjusting power consumed by a low noise amplifier in a receiver portion of a full duplex transceiver, said method comprising the steps of:

a. receiving at said transceiver a transmit power level indicator;

b. generating a transmit power control signal at said transceiver corresponding to said transmit power level indicator to control transmit signal power of a transmitter portion of said transceiver; and c. generating a low noise amplifier bias control signal proportional to said transmit power control signal to regulate a bias level of said low noise amplifier in said receiver portion of said transceiver.

2. The method for minimizing the power consumed by a low noise amplifier in a receive portion of a full duplex transceiver as recited in claim 1, further comprising the steps of:

a) transmitting from said transceiver a first communication to a remote transceiver;

b) generating a transmit power level indicator at said remote transceiver representing an adequate transmit power level of said transceiver for interaction with said remote transceiver; and c) transmitting from said remote transceiver to said transceiver a second communication including said transmit power level indicator.

3. The method for minimizing the power consumed by a low noise amplifier in a receive portion of a full duplex transceiver as recited in claim 2, further comprising the step of:

a) altering said bias level of said low noise amplifier to a level capable of receiving said transmit signal power from said transmitter portion and said receive signal power without said low noise amplifier entering into a compression state.

4. The method for minimizing the power consumed by a low noise amplifier in a receive portion of a full duplex transceiver as recited in claim 1, wherein said transceiver is a cellular telephone and said remote transceiver is a cellular base station.

5. The method for minimizing the power consumed by a low noise amplifier in a receive portion of a full duplex transceiver as recited in claim 4, wherein said communication system is a full duplex cellular system.

6. The method for minimizing the power consumed by a low noise amplifier in a receive portion of a full duplex transceiver as recited in claim 4, wherein said communication system is a CDPD cellular system.

7. The method for minimizing the power consumed by a low noise amplifier in a receive portion of a full duplex transceiver as recited in claim 4, wherein said transceiver assumes a form-factor compatible with a PCMCIA type II card.

8. A method for undersizing a duplexer in a full duplex transceiver without causing a low noise amplifier in a receiver portion of said full duplex transceiver to enter into a compression state, said method comprising the steps of:

a. receiving at said transceiver a transmit power level indicator describing an adequate transmit power level at which a transmitter portion of said transceiver should operate;

b. generating a transmit power control signal proportional to said transmit power level indicator to control a transmit portion of said transceiver; and c. biasing said low noise amplifier at a level proportional to said transmit power control signal to mitigate said low noise amplifier from entering into said compression state.

9. The method for undersizing a duplexer in a full duplex transceiver without causing a low noise amplifier in a receiver portion of said full duplex transceiver to enter into a compression state, as recited in claim 8 further comprising the steps of:

a) transmitting from said transceiver a first communication to a remote transceiver;

b) generating a transmit power level indicator at said remote transceiver representing said adequate transmit power level of said transceiver for interaction with said remote transceiver; and c) transmitting from said remote transceiver to said transceiver a second communication including said transmit power level indicator.

10. The method for undersizing a duplexer in a full duplex transceiver without causing a low noise amplifier in a receiver portion of said full duplex transceiver to enter into a compression state, as recited in claim 9, wherein said transceiver is a cellular telephone and said remote transceiver is a cellular base station.

11. The method for undersizing a duplexer in a full duplex transceiver without causing a low noise amplifier in a receiver portion of said full duplex transceiver to enter into a compression state, as recited in claim 9, wherein transceiver and said remote transceiver operate in a full duplex cellular system.

12. The method for undersizing a duplexer in a full duplex transceiver without causing a low noise amplifier in a receiver portion of said full duplex transceiver to enter into a compression state, as recited in claim 8 further comprising the step of integrating said transceiver into a form-factor compatible with a PCMCIA type II card.

13. A bias circuit for a low noise amplifier in a receiver portion of a full duplex transceiver wherein the transmit signal power of said transceiver at said low noise amplifier exceeds the receive signal power present to said low noise amplifier and further wherein said transmit signal power varies as directed by a remote transceiver, comprising:

a) a transmit power level indicator describing an adequate transmit power level at which a transmitter portion of said transceiver should operate;

b) a transmit power control signal derived from and proportional to said transmit power level indicator to control said transmit portion of said transceiver; and c) a low noise amplifier bias control signal proportional to said transmit power control signal to regulate a bias level of said low noise amplifier to mitigate compression of said low noise amplifier from said adequate transmit power level.

14. The bias circuit for a low noise amplifier in a receiver portion of a full duplex transceiver as recited in claim 13, further comprising a digital to analog converter to transform said transmit power level indicator into said transmit power control signal.

15. The bias circuit for a low noise amplifier in a receiver portion of a full duplex transceiver as recited in claim 13, wherein said full duplex transceiver is compatible for operation with in a full duplex cellular system.

16. The bias circuit for a low noise amplifier in a receiver portion of a full duplex transceiver as recited in claim 13, wherein said full duplex transceiver is compatible for operation with in a CDPD cellular system.

17. A power minimizing full duplex transceiver having a duplexer providing insufficient isolation of transmit signal power to a receive portion of said transceiver and wherein said transmit signal power varies as directed by a remote transceiver, said transceiver comprising:

a. a transmit portion including, i. a digital to analog converter to transform a transmit power level indicator representing an adequate transmit power level of said transceiver for interaction with said remote transceiver into a transmit power control signal;

ii. a transmitter power control module operably coupled to said digital to analog converter to regulate said transmit signal power to said adequate transmit power level according to said transmit power control signal; and iii. a transmitter power amplifier responsive to said transmit power control signal generate said adequate transmit power level; and b. said receive portion including i. a low noise amplifier bias control module operably coupled to said transmit power control module to regulate a bias level proportional to said transmit power control signal within said receiver portion of said transceiver; and ii. a low noise amplifier operably coupled to said low noise amplifier bias control module to amplify a receive signal and any of a transmit signal from said transmit portion and wherein said low noise amplifier is further biased by said low noise amplifier bias control module to allow said low noise amplifier to operate in a non-compression state in the presence of said transmit signal.

18. The power minimizing full duplex transceiver having a duplexer providing insufficient isolation of transmit signal power to a receive portion of said transceiver, as recited in claim 17, wherein said transmit and receive portions further comprise functionality for cooperatively operating in a cellular system.

19. The power minimizing full duplex transceiver having a duplexer providing insufficient isolation of transmit signal power to a receive portion of said transceiver, as recited in claim 17, wherein said transmit and receive portions further comprise functionality for cooperatively operating in a CDPD cellular system.

20. The power minimizing full duplex transceiver having a duplexer providing insufficient isolation of transmit signal power to a receive portion of said transceiver, as recited in claim 17, wherein said full duplex transceiver including said transmit and receive portions are incorporated into a PCM-CIA type card.

* * * * *